United States Patent
Liu et al.

(10) Patent No.: US 9,025,120 B2
(45) Date of Patent: May 5, 2015

(54) LIQUID CRYSTAL DISPLAY

(75) Inventors: Yi-Fan Liu, Orlando, FL (US); Yu-Cheng Lai, Taichung (TW)

(73) Assignees: Industrial Technology Research Institute, Hsinchu (TW); University of Central Florida Research Foundation, Inc., Orlando, FL (US)

( * ) Notice: Subject to any disclaimer, the term of this patent is extended or adjusted under 35 U.S.C. 154(b) by 403 days.

(21) Appl. No.: 13/556,184

(22) Filed: Jul. 23, 2012

(65) Prior Publication Data

US 2014/0022494 A1    Jan. 23, 2014

(51) Int. Cl.
    *G02F 1/1343*     (2006.01)
    *G02F 1/1337*     (2006.01)
    *G02F 1/137*     (2006.01)

(52) U.S. Cl.
    CPC .... *G02F 1/134363* (2013.01); *G02F 1/133707* (2013.01); *G02F 2001/13793* (2013.01); *G02F 2201/123* (2013.01); *G02F 2201/128* (2013.01)

(58) Field of Classification Search
    CPC ............. G02F 1/134363; G02F 1/134309; G02F 2001/134381; G02F 1/133707; G02F 1/13731; C09K 19/02; C09K 19/0275
    USPC .......................................................... 349/141
    See application file for complete search history.

(56) References Cited

U.S. PATENT DOCUMENTS

| | | | |
|---|---|---|---|
| 6,201,589 B1 * | 3/2001 | Tombling et al. | 349/141 |
| 7,342,632 B2 | 3/2008 | Miyachi et al. | |
| 7,420,640 B2 * | 9/2008 | Chae | 349/141 |
| 7,667,807 B2 | 2/2010 | Nishida | |
| 7,724,335 B2 * | 5/2010 | Miyachi et al. | 349/141 |
| 8,120,739 B2 | 2/2012 | Mizoguchi | |
| 2007/0070282 A1 * | 3/2007 | Shibahara et al. | 349/141 |
| 2009/0213285 A1 | 8/2009 | Yun et al. | |
| 2009/0219478 A1 | 9/2009 | Park et al. | |
| 2010/0302492 A1 | 12/2010 | Kubota et al. | |
| 2010/0328565 A1 | 12/2010 | Kubota et al. | |
| 2011/0176100 A1 | 7/2011 | Nishida et al. | |

OTHER PUBLICATIONS

Yu-Cheng Lai et al., "Novel electrodes for low voltage and high transmittance blue-phase liquid crystal displays", IMID 2011 Digest, Oct. 2011, p. 1-3.

(Continued)

*Primary Examiner* — Edward Glick
*Assistant Examiner* — David Chung
(74) *Attorney, Agent, or Firm* — Jianq Chyun IP Office (57) ABSTRACT

A liquid crystal display is provided, which includes a first substrate, a plurality of pixels, a second substrate, a plurality of floating electrodes, and a liquid crystal layer. The pixels are arranged in an array on the first substrate, and each of the pixels includes a first electrode and a second electrode, wherein a space is maintained between the first electrode and the second electrode. The floating electrodes are disposed on the second substrate and above the spaces. The liquid crystal layer is located between the first substrate and the second substrate, wherein the liquid crystal layer is optically isotropic when the first electrode and the second electrode have no voltage difference; and the liquid crystal layer is optically anisotropic when the first electrode and the second electrode have a voltage difference therebetween.

14 Claims, 7 Drawing Sheets

(56) References Cited

OTHER PUBLICATIONS

Meizi Jiao et al., "Low Voltage and High Transmittance Polymer-Stabilized Blue-Phase Liquid Crystal Displays", SID 10 Digest, May 2010, p. 167-169.

Yan Li et al., "Transmissive and Transflective Blue-Phase LCDs With Enhanced Protrusion Electrodes", Journal of Display Technology, vol. 7, No. 7, Jul. 2011, p. 359-361.

Linghui Rao et al., "Low Voltage Blue-Phase LCDs With Double-Penetrating Fringe Fields", Journal of Display Technology, vol. 6, No. 8, Aug. 2010, p. 1-3.

Linghui Rao et al., "A large Kerr constant polymer-stabilized blue phase liquid crystal", Applied Physics Letter 98, 081109, Feb. 24, 2011, p. 1-3.

Linghui Rao et al., "Low voltage blue-phase liquid crystal displays", Applied Physics Letters 95, 231101, Dec. 7, 2009, p. 1-3.

\* cited by examiner

FIG. 7B

LIQUID CRYSTAL DISPLAY

TECHNICAL FIELD

The technical field relates to a liquid crystal display.

BACKGROUND

As display technology develops, consumers' demand for higher display quality of display devices is growing. Besides resolution, contrast ratio, viewing angle, grey level inversion, and color saturation, now consumers also have higher standard for the response time of display devices.

To satisfy the consumers' demand, manufacturers in the field of displays are devoted to the development of blue phase liquid crystal displays which have the property of quick response time. Take blue phase liquid crystal material as an example, generally a transverse electric field is required such that the blue phase liquid crystal material can function as a light valve. Now some manufacturers begin using an electrode design of IPS (In-Plane Switching) display to drive the blue phase liquid crystal molecules in the blue phase liquid crystal display. However, the electrode design of the conventional IPS display has the problem of poor transmittance.

SUMMARY

The disclosure provides a liquid crystal display having a floating electrode.

The disclosure provides a liquid crystal display, which includes a first substrate, a plurality of pixels, a second substrate, a plurality of floating electrodes, and a liquid crystal layer. The pixels are arranged in an array on the first substrate, and each of the pixels includes a first electrode and a second electrode, wherein a space is maintained between the first electrode and the second electrode. The floating electrodes are disposed on the second substrate and above the spaces. The liquid crystal layer is located between the first substrate and the second substrate, wherein the liquid crystal layer is optically isotropic when the first electrode and the second electrode have no voltage difference; and the liquid crystal layer is optically anisotropic when the first electrode and the second electrode have a voltage difference therebetween.

Several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1' is a schematic cross-sectional view of a liquid crystal display according to another embodiment of the disclosure.

DETAILED DESCRIPTION OF DISCLOSED EMBODIMENTS

Figure 1:
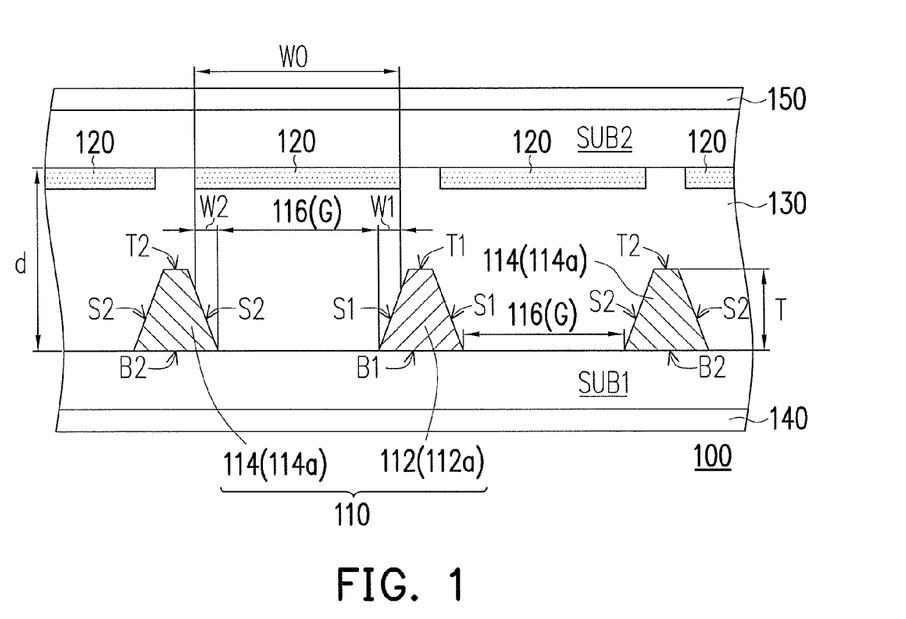
FIG. 1 is a schematic cross-sectional view of a liquid crystal display according to an embodiment of the disclosure.
Figure 2:
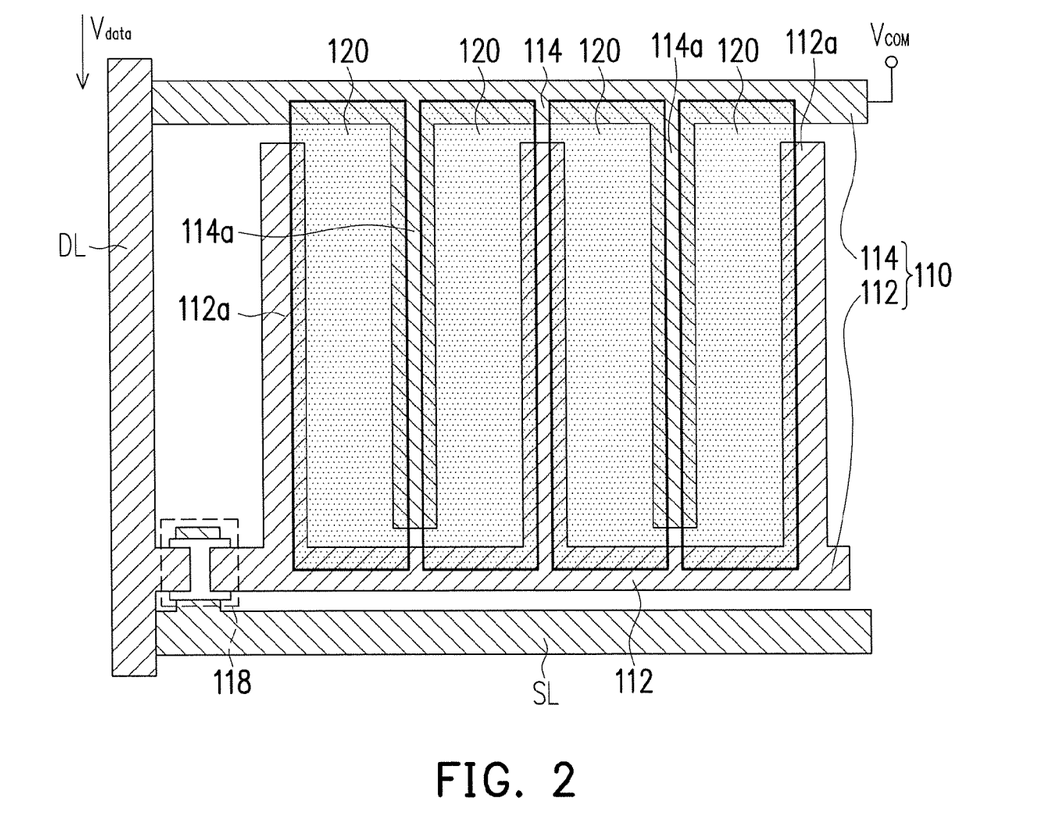
FIG. 2 illustrates a layout of a pixel according to an embodiment of the disclosure.
Figure 3:
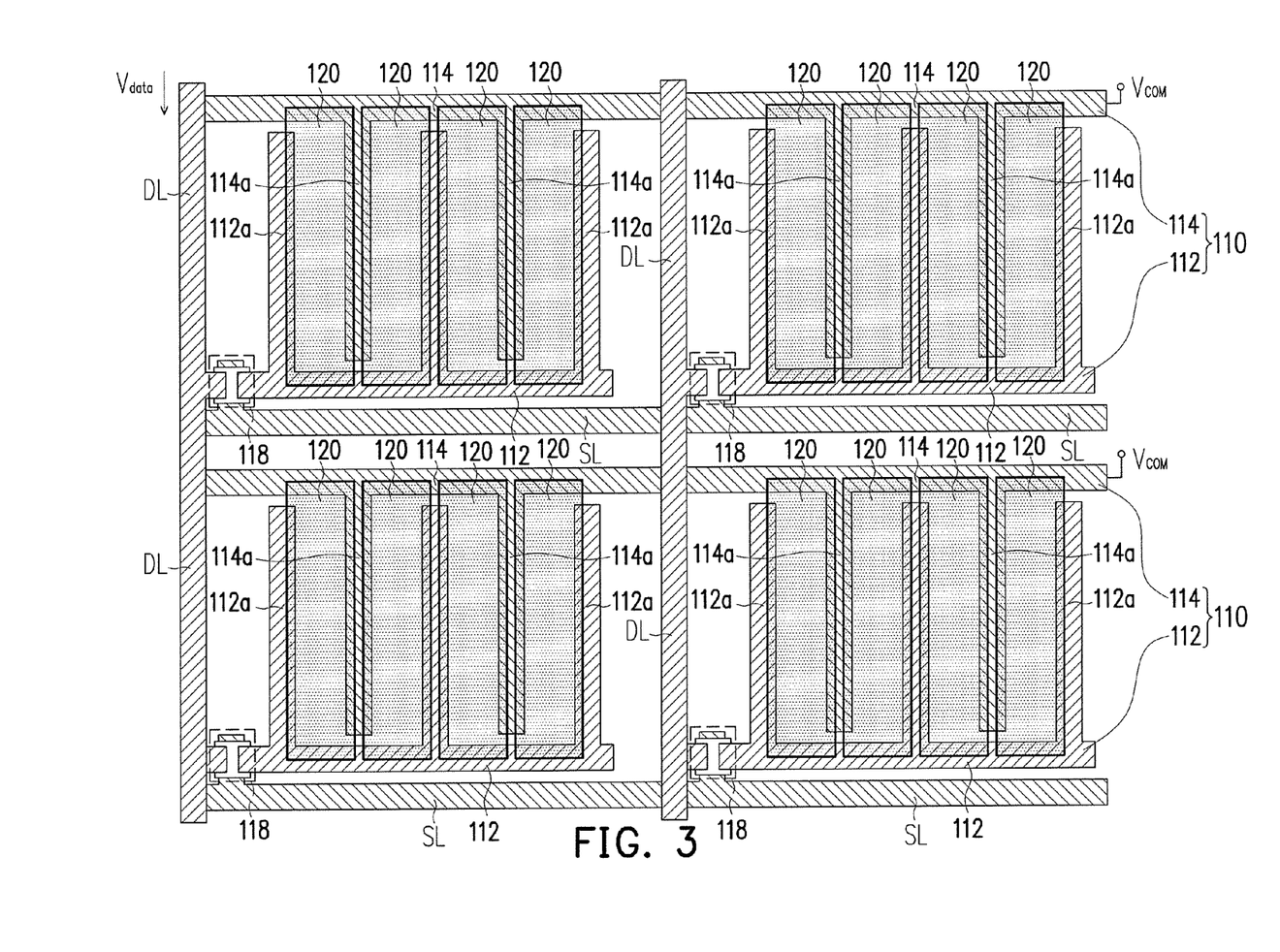
FIG. 3 illustrates a layout of a plurality of pixels according to an embodiment of the disclosure.

FIG. 1 is a schematic cross-sectional view of a liquid crystal display according to an embodiment of the disclosure. FIG. 2 illustrates a layout of a pixel according to an embodiment of the disclosure. FIG. 3 illustrates a layout of a plurality of pixels according to an embodiment of the disclosure. Referring to FIG. 1, FIG. 2, and FIG. 3, a liquid crystal display 100 of this embodiment includes a first substrate SUB1, a plurality of pixels 110, a second substrate SUB2, a plurality of floating electrodes 120, and a liquid crystal layer 130. The pixels 110 are arranged in an array on the first substrate SUB1 (as shown in FIG. 3), and each of the pixels 110 includes a first electrode 112 and a second electrode 114, wherein a space 116 is maintained between the first electrode 112 and the second electrode 114. The floating electrodes 120 are disposed on the second substrate SUB2 and above the spaces 116. The liquid crystal layer 130 is located between the first substrate SUB1 and the second substrate SUB2, and the liquid crystal layer 130 is optically isotropic when the first electrode 112 and the second electrode 114 have no voltage difference. In addition, the liquid crystal layer 130 is optically anisotropic when the first electrode 112 and the second electrode 114 have a voltage difference therebetween.

It is noted that, in this embodiment, the birefringence (Δn) of the liquid crystal layer 130 is, for example, in direct proportion to a square ($E^2$) of an electric field between the first electrode 112 and the second electrode 114. For instance, the liquid crystal layer 130 is a blue phase liquid crystal layer or other liquid crystal layers having the aforementioned optical property. The liquid crystal layer 130 may be a polymer-stabilized blue phase liquid crystal layer.

The liquid crystal display 100 of this embodiment further includes a first polarizer 140 and a second polarizer 150, wherein the first polarizer 140 is disposed on the first substrate SUB1 and the second polarizer 150 is disposed on the second substrate SUB2. To optimize the optical performance of the liquid crystal display 100, persons with ordinary skill in the art may selectively dispose at least one required optical film (such as a phase retarder, a diffuser, etc.) on the first substrate SUB1 and/or the second substrate SUB2.

In this embodiment, the pixels 110 that are arranged in array on the first substrate SUB1 form a pixel array, and the first electrode 112 and the second electrode 114 of each of the pixels 110 are adapted for providing a transverse electric field that is substantially parallel to the first substrate SUB1, so as to drive the liquid crystal layer 130 and make the liquid crystal layer 130 become optically anisotropic. As shown in FIG. 2, each of the pixels 110 further includes an active device 118 electrically connected to the first electrode 112, and the second electrode 114 is electrically coupled to a common voltage Vcom. In addition, the liquid crystal display 100 of this embodiment further includes a plurality of scan lines SL and a plurality of data lines DL disposed on the first substrate SUB1, wherein each of the active devices 118 is electrically connected to the corresponding scan line SL and the corresponding data line DL respectively.

The transverse electric field between the first electrode 112 and the second electrode 114 results from the voltage difference between the first electrode 112 and the second electrode 114. The voltage difference between the first electrode 112 and the second electrode 114 affects the orientation of the liquid crystal molecules in the liquid crystal layer 130 and consequently determines a transmittance of the liquid crystal layer 130 between the first electrode 112 and the second electrode 114. For example, because the second electrode 114 is electrically coupled to the common voltage Vcom (e.g. a voltage source of a constant voltage or a voltage source of a periodically-variable voltage), and the first electrode 112 is electrically connected to the corresponding data line DL via the active device 118, a data voltage Vdata transmitted by the data line DL determines the transmittance of the liquid crystal layer 130 between the first electrode 112 and the second electrode 114.

In this embodiment, the first electrode 112 and the second electrode 114 of the pixel 110 are both finger-shaped electrodes, for example. Each of the first electrodes 112 includes a plurality of first strip branches 112a connected to each other, and each of the second electrodes 114 includes a plurality of second strip branches 114a connected to each other, wherein the first strip branches 112a and the second strip branches 114a are alternately arranged on the first substrate SUB1. In this embodiment, a material of the first electrode 112 and the second electrode 114 includes a metal or a conductive oxide. For instance, the first electrode 112 and the second electrode 114 may be composed of a single metal layer or an alloy layer. The first electrode 112 and the second electrode 114 may also be formed by stacking multiple metal layers or multiple alloy layers. In addition, the aforementioned conductive oxide is indium tin oxide (ITO), indium zinc oxide (IZO), or indium-gallium-zinc oxide (IGZO), for example.

As shown in FIG. 1, each of the first strip branches 112a includes a first bottom surface B1 in contact with the first substrate SUB1 and a first top surface T1 opposite to the first bottom surface B1. Each of the second strip branches 114a includes a second bottom surface B2 in contact with the first substrate SUB1 and a second top surface T2 opposite to the second bottom surface B2, wherein an area of the first bottom surface B1 is larger than an area of the first top surface T1, and an area of the second bottom surface B2 is larger than an area of the second top surface T2. In addition, each of the first strip branches 112a includes a plurality of first side surfaces S1 connected with the first bottom surface B1 and the first top surface T1. Each of the second strip branches 114a includes a plurality of second side surfaces S2 connected with the second bottom surface B2 and the second top surface T2, wherein the first side surface S1 is an inclined plane, and the second side surface S2 is an inclined plane.

For example, the first bottom surface B1 of the first strip branch 112a and the second bottom surface B2 of the second strip branch 114a have the same width, and the widths of the first bottom surface B1 and the second bottom surface B2 are respectively in a range of 1 to 10 micrometers. The first top surface T1 of the first strip branch 112a and the second top surface T2 of the second strip branch 114a have the same width, for example, and the widths of the first top surface T1 and the second top surface T2 are respectively in a range of 0.1 to 10 micrometers.

As shown in FIG. 1 and FIG. 2, each of the floating electrodes 120 partially overlaps with the adjacent first electrode 112 and second electrode 114. For instance, each of the floating electrodes 120 has a width W0, an overlapping width of each floating electrode 120 and the adjacent first electrode 112 is W1, and an overlapping width of each floating electrode 120 and the adjacent second electrode 114 is W2. That is, the width W0 of the floating electrode 120 is larger than the space 116(G) between the first electrode 112 and the second electrode 114, and W0, W1, and W2 satisfy the following relations:

$$0 < W1/W0 \leq 0.5; \text{ and}$$

$$0 < W2/W0 \leq 0.5.$$

In an applicable embodiment of the disclosure, W1 may be equal to W2. Moreover, $0.01 < W1/W0 \leq 0.5$ and $0.01 < W2/W0 \leq 0.5$.

As shown in FIG. 1 and FIG. 2, the width of each of the floating electrodes 120 is W0, and the space 116 between the first electrode 112 and the second electrode 114 is G, wherein $0.1 \leq G/W0 < 1$. In this embodiment, the space 116(G) is for example in a range of 2-10 micrometers, and the width W0 of the floating electrode 120 is, for example, in a range of 2-10 micrometers.

However, according to the disclosure, the floating electrode 120 is not restricted to be overlapped with the adjacent first electrode 112 and second electrode 114. In other words, each of the floating electrodes 120 may not overlap with the adjacent first electrode 112 and second electrode 114. That is, the width W0 of the floating electrode 120 is smaller than the space 116(G) between the first electrode 112 and the second electrode 114, wherein the width of each floating electrode 120 is W0, the space between the adjacent first electrode 112 and second electrode 114 is G, and $1 \leq G/W0 \leq 2$, as shown in FIG. 1'.

For example, the width W0 of the floating electrode 120 is in a range of 2.4-4.8 micrometers, and the space G between the first electrode 112 and the second electrode 114 is in a range of 2.4-4.8 micrometers.

In this embodiment, a thickness of each of the first electrodes 112 and each of the second electrodes 114 in the pixels 110 is T, for example. A distance between the first substrate SUB1 and the second substrate SUB2 is d, wherein $0.1 \leq T/d \leq 0.9$. In this embodiment, the thickness T of the first electrode 112 and the second electrode 114 is, for example, in a range of 0.5-8 micrometers, and the distance d between the first substrate SUB1 and the second substrate SUB2 is in a range of 1-12 micrometers, for example.

With reference to FIG. 3, when the plurality of pixels 110 are arranged in array on the first substrate SUB1, the second electrodes 114 of the pixels 110 in the same row are electrically connected to each other and simultaneously electrically coupled to the common voltage Vcom. In addition, the first electrodes 112 of the pixels 110 in the same row are electrically connected only to the corresponding data lines DL via the corresponding active devices 118 and are electrically insulated from each other.

Figure 4:
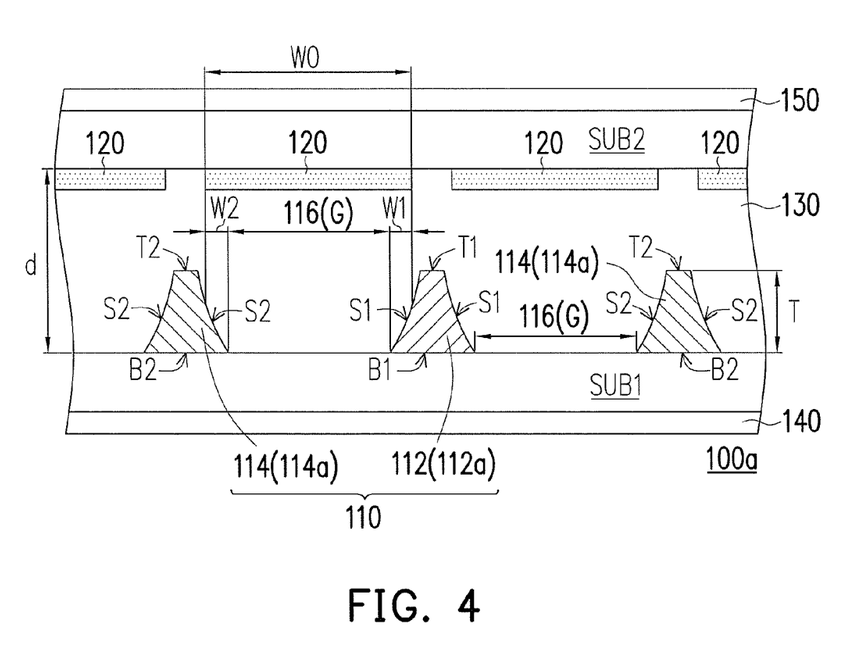
FIG. 4 is a schematic cross-sectional view of a liquid crystal display according to another embodiment of the disclosure.

FIG. 4 is a schematic cross-sectional view of a liquid crystal display according to another embodiment of the disclosure. Referring to FIG. 4, a liquid crystal display 100a of this embodiment is similar to the liquid crystal display 100 of FIG. 1 except that the first side surface S1 of the first electrode 112 is a curved plane and the second side surface S2 of the second electrode 114 is a curved plane as well.

It is noted that, in this embodiment, the floating electrode 120 is not restricted to be overlapped with the adjacent first electrode 112 and second electrode 114. In other words, each of the floating electrodes 120 may not overlap with the adjacent first electrode 112 and second electrode 114.

Figure 5A:
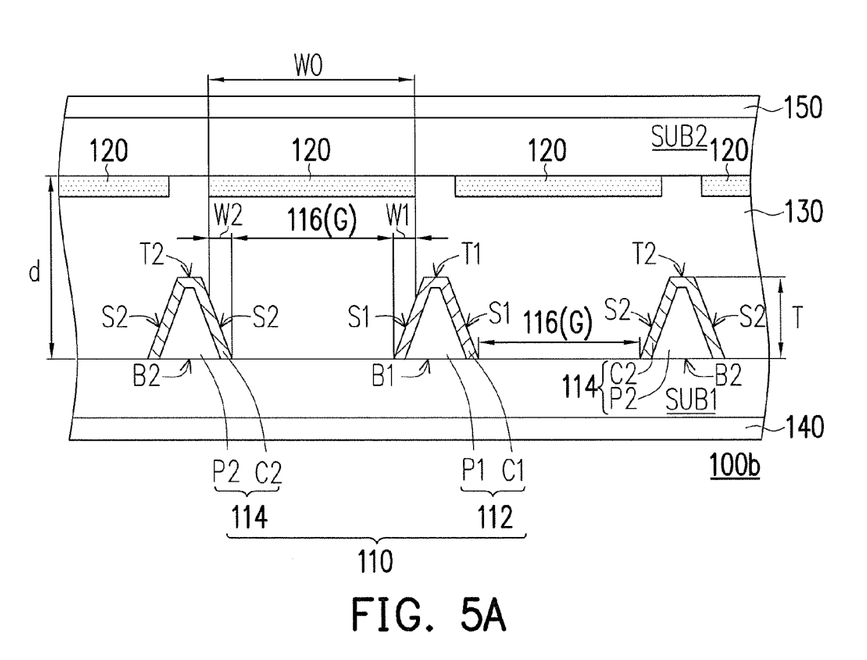
FIG. 5A and FIG. 5B are schematic cross-sectional views of a liquid crystal display according to yet another embodiment of the disclosure.
Figure 5B:
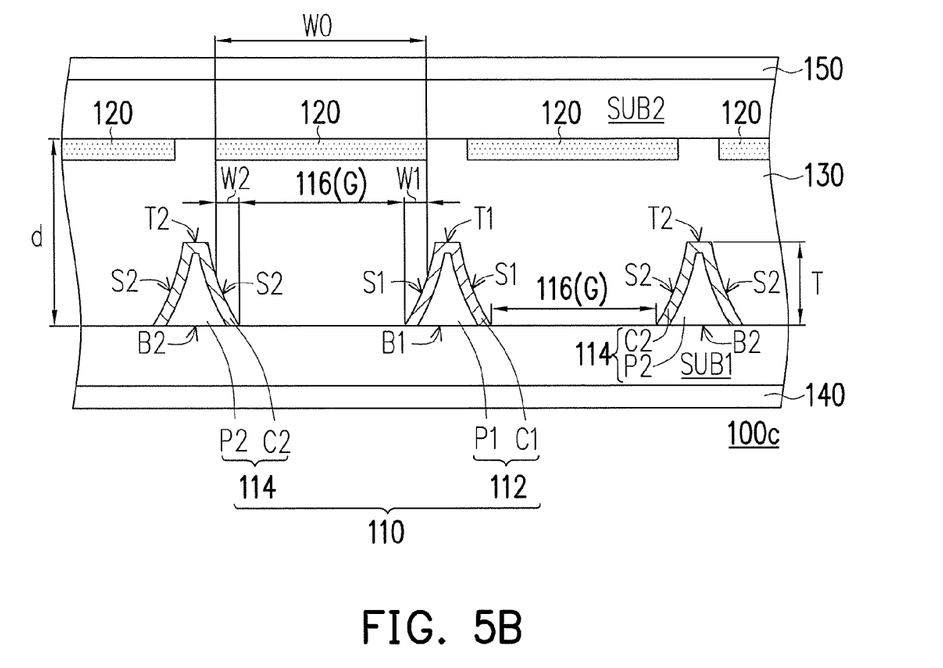

FIG. 5A and FIG. 5B are schematic cross-sectional views of a liquid crystal display according to yet other embodiment of the disclosure. Referring to FIG. 5A, a liquid crystal display 100b of this embodiment is similar to the liquid crystal display 100 of FIG. 1 except that each of the first electrodes 112 includes a first protruding structure P1 and a first conductive layer C1 covering the first protruding structure P1, and each of the second electrodes 114 includes a second protruding structure P2 and a second conductive layer C2 covering the second protruding structure P2. For example, a material of the first protruding structure P1 and the second protruding structure P2 is a dielectric material, and a material of the first conductive layer C1 and the second conductive layer C2 is a metal, an alloy, a conductive oxide, or other conductive materials. In addition, the aforementioned conductive oxide is indium tin oxide (ITO), indium zinc oxide (IZO), or indium-gallium-zinc oxide (IGZO), for example.

It is noted that, in this embodiment, the floating electrode 120 is not restricted to be overlapped with the adjacent first electrode 112 and second electrode 114. In other words, each of the floating electrodes 120 may not overlap with the adjacent first electrode 112 and second electrode 114.

Referring to FIG. 5B, a liquid crystal display 100c of this embodiment is similar to the liquid crystal display 100b of FIG. 5A except that the first side surface S1 of the first electrode 112 is a curved plane and the second side surface S2 of the second electrode 114 is a curved plane as well.

It is noted that, in this embodiment, the floating electrode 120 is not restricted to be overlapped with the adjacent first electrode 112 and second electrode 114. In other words, each of the floating electrodes 120 may not overlap with the adjacent first electrode 112 and second electrode 114.

Figure 6A:
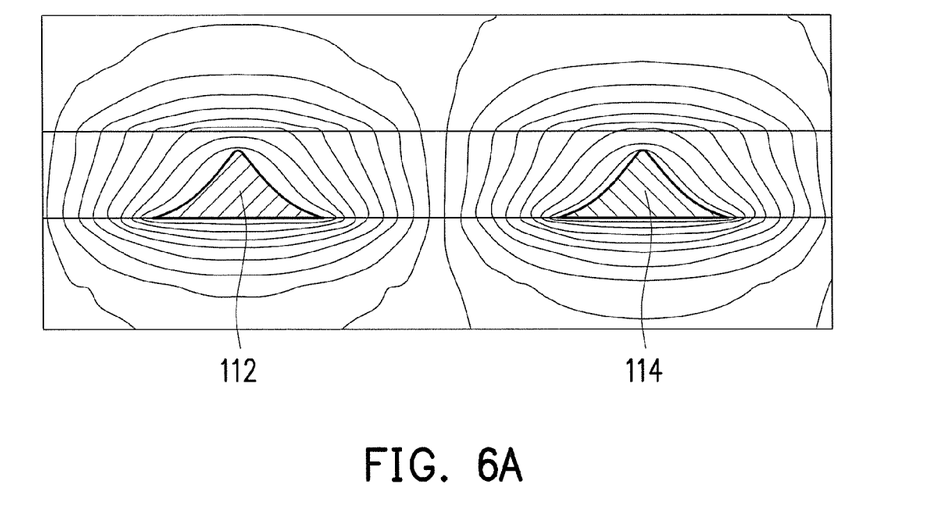
FIG. 6A illustrates a distribution of equipotential lines of a liquid crystal display without a floating electrode.
Figure 6B:
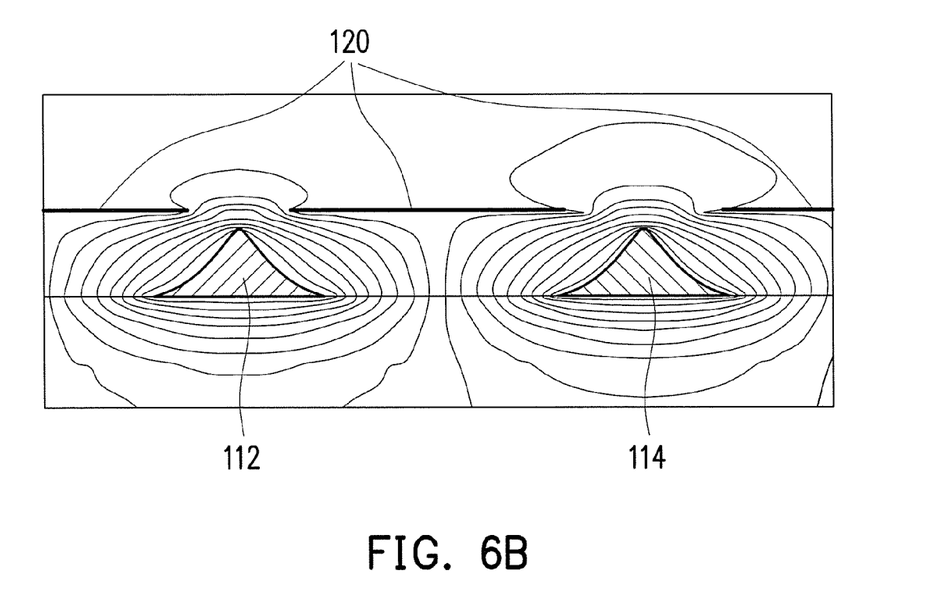
FIG. 6B illustrates a distribution of equipotential lines of a liquid crystal display with a floating electrode.

FIG. 6A illustrates a distribution of equipotential lines of a liquid crystal display without the floating electrode, and FIG. 6B illustrates a distribution of equipotential lines of a liquid crystal display with the floating electrode. With reference to FIG. 6A and FIG. 6B, the distribution of equipotential lines of the liquid crystal display without the floating electrode (as shown in FIG. 6A) are scattered while the distribution of equipotential lines of the liquid crystal display with the floating electrode (as shown in FIG. 6B) are denser. The floating electrode 120 enhances the electric field between the floating electrode 120 and the first electrode 112 and the electric field between the floating electrode 120 and the second electrode 114. Therefore, a combination of the first electrode 112, the second electrode 114, and the floating electrode 120 reduces the driving voltage for the liquid crystal display and improves transmittance.

Figure 7A:
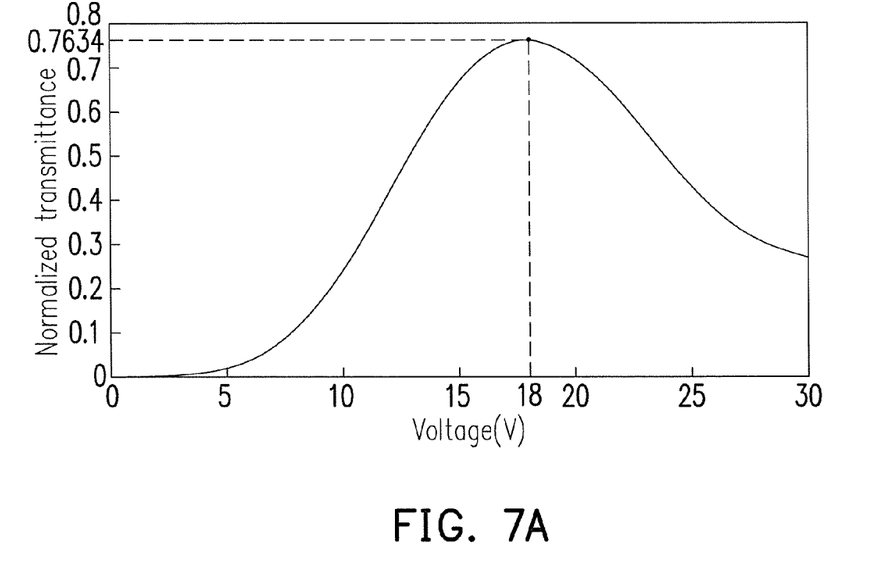
FIG. 7A illustrates a voltage-transmittance curve of a liquid crystal display without a floating electrode.
Figure 7B:
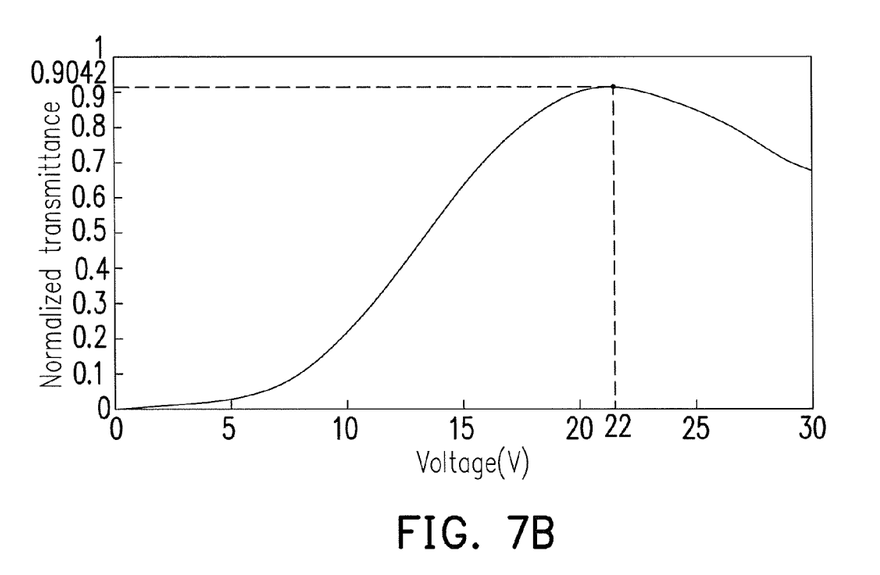
FIG. 7B illustrates a voltage-transmittance curve of a liquid crystal display with a floating electrode.

FIG. 7A illustrates a voltage-transmittance curve of the liquid crystal display without the floating electrode, and FIG. 7B illustrates a voltage-transmittance curve of the liquid crystal display with the floating electrode. With reference to FIG. 7A and FIG. 7B, the liquid crystal display without the floating electrode (as shown in FIG. 7A) has a transmittance of 76.3% when the driving voltage is 18 volts, and the liquid crystal display with the floating electrode (as shown in FIG. 7B) has a transmittance of 90.42% when the driving voltage is 22 volts. It is apparent that disposing the floating electrode 120 greatly improves the transmittance or display brightness of the liquid crystal display without greatly increasing the driving voltage.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A liquid crystal display, comprising:
    a first substrate;
    a plurality of pixels arranged in an array on the first substrate, wherein each of the pixels includes a first electrode and a second electrode, and a space is maintained between the first electrode and the second electrode, wherein the first electrode comprises a first bottom surface in contact with the first substrate, a first top surface opposite to the first bottom surface and a plurality of first side surfaces connected with the first bottom surface and the first top surface, and each of the first side surfaces is a curved plane or an inclined plane, and wherein the second electrode comprises a second bottom surface in contact with the first substrate, a second top surface opposite to the second bottom surface and a plurality of second side surfaces connected with the second bottom surface and the second top surface, and each of the second side surfaces is a curved plane or an inclined plane;
    a second substrate;
    a plurality of floating electrodes disposed on the second substrate and above the spaces, wherein a gap is maintained between any two adjacent floating electrodes, the first top surface and the second top surface are aligned with the gaps, and the floating electrodes partially overlap with the first side surfaces and the second side surfaces; and
    a liquid crystal layer located between the first substrate and the second substrate, wherein the liquid crystal layer is optically isotropic when the first electrode and the second electrode have no voltage difference, and the liquid crystal layer is optically anisotropic when the first electrode and the second electrode have a voltage difference therebetween.

2. The liquid crystal display according to claim 1, wherein each of the first electrodes comprises a plurality of first strip branches connected with each other, each of the second electrodes comprises a plurality of second strip branches connected with each other, and the first strip branches and the second strip branches are alternately arranged on the first substrate.

3. The liquid crystal display according to claim 1, wherein an area of the first bottom surface is larger than an area of the first top surface, and an area of the second bottom surface is larger than an area of the second top surface.

4. The liquid crystal display according to claim 1, wherein the width of each floating electrode is W0, an overlapping width of each floating electrode and the adjacent first electrode is W1, an overlapping width of each floating electrode and the adjacent second electrode is W2, and W0, W1, and W2 satisfy the following relations:

$0 < W1/W0 \leq 0.5;$ and $0 < W2/W0 \leq 0.5.$

5. The liquid crystal display according to claim 1, wherein the width of each floating electrode is W0, and the space between the adjacent first electrode and second electrode is G, wherein $0.1 \leq G/W0 < 1$.

6. The liquid crystal display according to claim 1, wherein a thickness of each of the first electrodes and each of the second electrodes is T, and a distance between the first substrate and the second substrate is d, wherein $0.1 \leq T/d \leq 0.9$.

7. The liquid crystal display according to claim 1, wherein a material of each of the first electrodes and each of the second electrodes comprises a metal or a conductive oxide.

8. The liquid crystal display according to claim 1, wherein each of the first electrodes comprises a first protruding structure and a first conductive layer covering the first protruding structure, and each of the second electrodes comprises a second protruding structure and a second conductive layer covering the second protruding structure.

9. The liquid crystal display according to claim 1, wherein a birefringence ($\Delta n$) of the liquid crystal layer is in direct proportion to a square ($E^2$) of an electric field between the first electrode and the second electrode.

10. The liquid crystal display according to claim 1, wherein each of the pixels further comprises an active device electrically connected to the first electrode, and the second electrode is electrically coupled to a common voltage.

11. The liquid crystal display according to claim 10, further comprising a plurality of scan lines and a plurality of data lines, wherein the scan lines and the data lines are disposed on the first substrate, and each of the active devices is electrically connected to the corresponding scan line and the corresponding data line respectively.

12. The liquid crystal display according to claim 1, further comprising:
 a first polarizer disposed on the first substrate; and
 a second polarizer disposed on the second substrate.

13. The liquid crystal display according to claim 1, wherein a width of the floating electrode is larger than the space between the first electrode and the second electrode.

14. The liquid crystal display according to claim 1, wherein a width of the first top surface and a width of the second top surface is smaller than the gap between two adjacent floating electrodes.

* * * * *